United States Patent [19]

Fukasawa

[11] Patent Number: 4,930,086
[45] Date of Patent: May 29, 1990

[54] METHOD AND APPARATUS FOR SEQUENTIAL PRODUCT PROCESSING WITH LIMITED PRODUCT BAR CODE READING

[75] Inventor: Yoshihito Fukasawa, Yokohama, Japan

[73] Assignee: Kabushiki Kaisha Toshiba, Kawasaki, Japan

[21] Appl. No.: 167,193

[22] Filed: Mar. 11, 1988

[30] Foreign Application Priority Data

Mar. 19, 1987 [JP] Japan .................................. 62-65141

[51] Int. Cl.$^5$ ............................................. G06F 15/46
[52] U.S. Cl. ..................................... 364/468; 235/375; 364/478
[58] Field of Search ........ 364/468, 478, 200 MS File, 364/900 MS File; 235/375, 383, 385

[56] References Cited

U.S. PATENT DOCUMENTS

| 4,332,012 | 5/1982 | Sekine et al. | 364/468 |
| 4,408,291 | 10/1983 | Gunzberg et al. | 364/468 X |
| 4,473,883 | 9/1984 | Yoshida et al. | 364/468 X |
| 4,564,913 | 1/1986 | Yomogida et al. | 364/468 X |
| 4,646,245 | 2/1987 | Prodel et al. | 364/468 |
| 4,654,512 | 3/1987 | Gardosi | 364/468 X |

FOREIGN PATENT DOCUMENTS

| 0129853A1 | 1/1985 | European Pat. Off. . |
| DE34063-25A1 | 8/1985 | Fed. Rep. of Germany . |
| 883620 | 12/1961 | United Kingdom . |
| 2049994A | 12/1980 | United Kingdom . |

OTHER PUBLICATIONS

"7-Axis Robot Automates Manufacturing Work Cell", Electronic Design, vol. 31, (1983), Nov., No. 23, Waseca, Minn., Denville, N.J., U.S.A., pp. 141-148.
Kiyoji ASAI, "Development for NC to CIM," Intelligent Factory, a separate volume of Nikkei Mechanical, Nov. 24, 1986, pp. 22-30.

Primary Examiner—Joseph Ruggiero
Attorney, Agent, or Firm—Foley & Lardner, Schwartz, Jeffery, Schwaab, Mack, Blumenthal & Evans

[57] ABSTRACT

There is provided a method including a plurality of processes for processing intermediary products stepwise by a plurality of processing units arranged at respective processes, thus to manufactur products while carrying intermediary products or carriers for accommodating them therein. This method comprises the steps of reading discrimination codes attached to the intermediary products or carriers prior to the first process, and recording the discrimination codes thus read as basic information and recording processing information in regard to the processings by the processing units at the respective processes in correspondence with the basic information. This method further comprises the step of selecting one processing unit from a plurality of processing units at the process of the next state on the basis of the processing information recorded. There is also provided an apparatus for implementing the above method, which includes supervisory control means for carrying out selective control of processing units. Thus, a manufacturing method and an apparatus therefor capable of implementing efficient manufacturing processing can be realized.

6 Claims, 15 Drawing Sheets

FIG. 4A
FIG. 4B
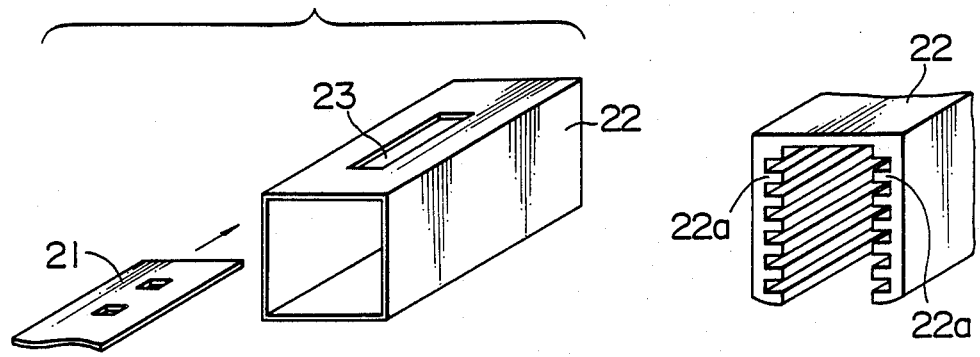
FIG. 6
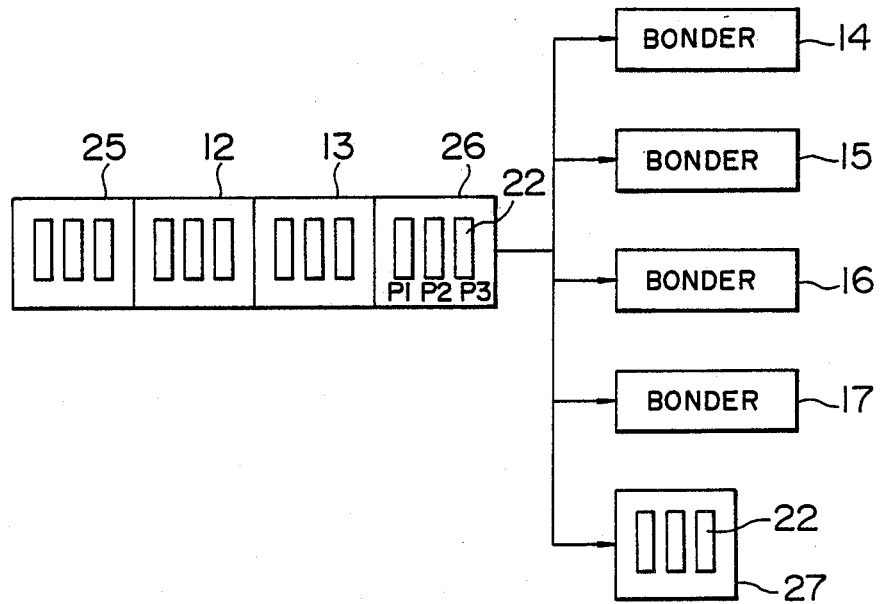

METHOD AND APPARATUS FOR SEQUENTIAL PRODUCT PROCESSING WITH LIMITED PRODUCT BAR CODE READING

BACKGROUND OF THE INVENTION

This invention relates to a method and an apparatus for manufacturing target products by processing units arranged at a plurality of manufacturing processes and, more particularly, to a method and an apparatus for manufacturing products capable of supervising or controlling carrying of intermediary, or semi-manufactured or processed products in order to efficiently allot or assign intermediary products to processing units.

The manufactures of various products including semiconductor devices are conducted with a plurality of manufacturing processes being combined. While carrying intermediary products via these processes, their assembling works are conducted. For instance, a method of manufacturing semiconductor devices comprises a series of processes, e.g., a die bonding process for mounting semiconductor components or elements on the lead frame, a cure process for setting resin used in the die bonding, a wire bonding process for connecting electrodes of the semiconductor components and leads of the lead frame using wires, a molding process for sealing wire-bonded regions using resin in the form of package, a cure process for setting the sealed resin by heating, and a bend process for bending leads projected from the resin, etc. For this reason, such an apparatus for manufacturing semiconductor devices is constituted that processing or manufacturing units, e.g., a mounter, a wire bonder, a molding unit, a cure unit, and a bend unit, etc. are arranged in succession from the upstream side of a carrying path for intermediary products. To the processing units at respective processes, carriers in which a plurality of lead frames on which unprocessed intermediary products are mounted are accommodated are carried or conveyed. By the load of the carriers, lead frames are taken one by one. Thus, predetermined processings will be conducted.

FIG. 1 is a block diagram showing a conventional example of a manufacturing apparatus in which processing units are arranged at a plurality of manufacturing processes, respectively as described above. This manufacturing apparatus includes four processes labeled I, II, III and IV: at the process I, four processing units $a_1$, $a_2$, $a_3$ and $a_4$ are disposed; at the process II, two processing units $b_1$ and $b_2$ are disposed; at the process III, four processing units $c_1$, $c_2$, $c_3$ and $c_4$ are disposed; and at the process IV, four processing units $d_1$, $d_2$, $d_3$ and $d_4$ are disposed. In this case, the processing units disposed in the same process carry out the same processing. The processing units at the respective processes are connected to a production supervisory computer 200. Thus, information indicative of output or the number of products, quality and working condition, etc. of respective units are delivered to the production supervisory computer 200. From the production supervisory computer 200, various instructions, e.g., kind of articles or goods to be processed, lot name, quantity, and processing condition, etc. are delivered every processes, and thus these units are controlled in response thereto. The intermediary products are carried and alloted to one processing unit of the groups of units at respective processes with they being as they are or they being accommodated in carriers in order of the processes I, II, III and IV. Thus, predetermined manufactured processings are implemented thereto. In this case, it is necessary to collate the kind of articles to which the production supervisory computer 200 gives an instruction for processing with the kind of articles that respective processing units process. For this reason, travel sheets or indication labels, e.g., magnetic cards, etc. are attached on intermediary products or carriers, and readers for automatically reading them and/or keyboards for artificially inputting information read therefrom are provided at respective processing units. Accordingly, for example, when an intermediary product or carrier is carried from the process I to the process II and the manufacturing processing is then implemented thereto, information indicative of kind of article or lot of the intermediary product or carrier processed is sent to the production supervisory computer 200. In response to this signal, the production supervisory computer 200 produces an instruction to transfer the intermediary product or carrier to the process III. Thus, the intermediary product or carrier is alloted or assigned to one of processing units $C_1$, $C_2$, $C_3$ and $C_4$ at the process III. Then, at these processing units $C_1$, $C_2$, $C_3$ and $C_4$ the indication label of the intermediary product or carrier carried is read. Thus, when the kind of the intermediary product or carrier is in correspondence with the kind of article alloted, the processing is initiated. Such an allocation has been conventionally carried out artificially.

However, with the conventional manufacturing method and apparatus, the following problems occur:

(1) Every time the kind or lot of the intermediary product is changed or exchange of the carrier occurs, communication with the production supervisory computer is required. Thus, the communication frequency becomes high, resulting in the possibility that an erroneous communication occurs.

(2) Since it is required to read the indication label every processing at respective processes, the reading frequency is high. Thus, there is apt to occur a circumstances such that reading is impossible due to the stain or missing or the indication label or the trouble of card reader, with the result that the system becomes confused.

(3) Where input of information of the kind of the article is artificially conducted, an erroneous input is likely to occur.

(4) Since the communication frequency becomes high and a large quantity of indication labels are required in the production of a large number of kinds and a small quantity, the above-mentioned troubles to are likely to occur, with the result that it takes much labor and time for their recovery.

(5) Since allocation of processing units within one process is artificially conducted, it is difficult to conduct an efficient allocation in consideration of the switching frequency of kind of article and/or the arrangement time for the processing unit.

As just described above, the conventional manufacturing method and apparatus have the problems that since indication labels indicative of kind of article, lot, or the like are read at respective processes, and thus the production ,supervisory computer supervises or controls carrying on the basis of this information, troubles are likely to occur and the improvement in the production efficiency is hindered.

SUMMARY OF THE INVENTION

An object of this invention is to provide manufacturing method and apparatus capable of reducing the reading frequency and communication frequency, and of carrying out an efficient processing.

The above object is achieved by a method of manufacturing products, including a plurality of processes for processing intermediary products stepwise by a plurality of processing units disposed at respective processes to manufacture products while carrying the intermediary products or carriers for accommodating intermediary products therein, the method comprising the steps of: reading discrimination codes attached to the intermediary products or the carriers prior to the first process; recording the discrimination codes thus read as basic information and recording processing information in regard to the processings by the processing units at the respective processes in correspondence with the basic information; and selecting one processing unit from the plurality of processing units at the process of the next stage on the basis of the processing information recorded.

The above object is also achieved by an apparatus for manufacturing products in which a plurality of processing units are arranged at a plurality of processes for processing intermediary products stepwise to manufacture products while carrying the intermediary products or carriers for accommodating the intermediary products therein, the apparatus comprising: read means for reading discrimination codes attached to the intermediary products or the carriers prior to the first process; and supervisory control means for recording the discrimination codes thus read by the read means as basic information and recording processing information processed by the processing units at respective processes in correspondence with the basic information, thus to select one processing unit from the plurality of processing units at the process of the next stage on the basis of the information recorded.

Since this invention employs a scheme to read the discrimination codes as the basic information prior to the first process to record processing information from the respective processing units in correspondence with the discrimination codes, thus to select one processing unit to be processed from those at a process of the next stage by these information, various advantages are provided as follows:

(1) A reader for reading discrimination codes or a key board for inputting discrimination codes, or the like every processing unit within the production process becomes unnecessary, with the result that the apparatus is simplified.

(2) Troubles due to an erroneous operation in the discriminative reading, degradation of the discrimination code, an error by an operator, etc. do not occur, thus preventing the responsibility from being lowered.

(3) It is unnecessary to conduct a communication with a host computer in regard to the discrimination codes every time the intermediary product or carrier moves, with the result that the communication frequency is reduced and the responsibility is improved.

(4) This apparatus effectively functions also by manually or artificially conducting a carrying instead of the automatic carrying system to add the function of inputting the result of carrying from the human system.

(5) Since the selection of the processing unit from the group of units having the same function within one process can be supervised by the computer, an efficient layout permitting the arrangement time, wait time, etc. to be minimized can be conducted on the real time basis.

BRIEF DESCRIPTION OF THE DRAWINGS

FIGS. 4(A) and 4(B) are perspective views showing the entirety of the magazine and a part thereof, respectively;

FIG. 6 is a plan view showing the arrangement of a cure unit and a wire bonder in the semiconductor manufacturing apparatus;

DETAILED DESCRIPTION OF THE INVENTION

This invention will be explained in more detail with reference to preferred embodiments shown.

Figure 1:
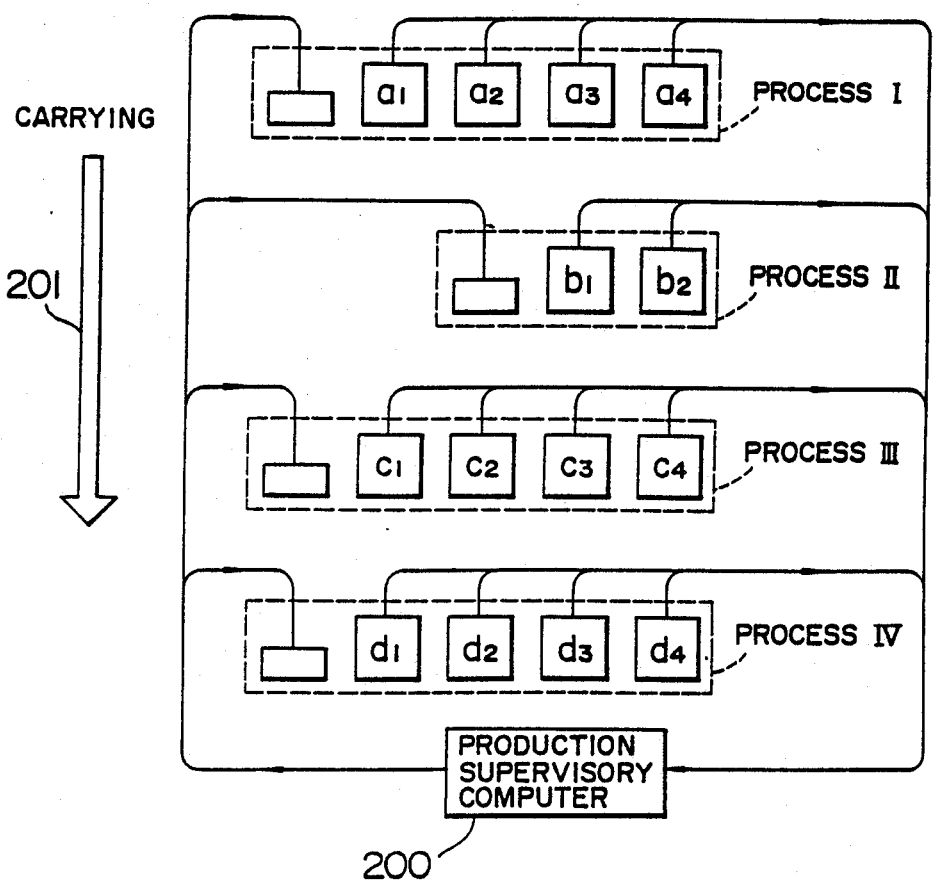
FIG. 1 is a block diagram showing a conventional manufacturing apparatus.
Figure 2:
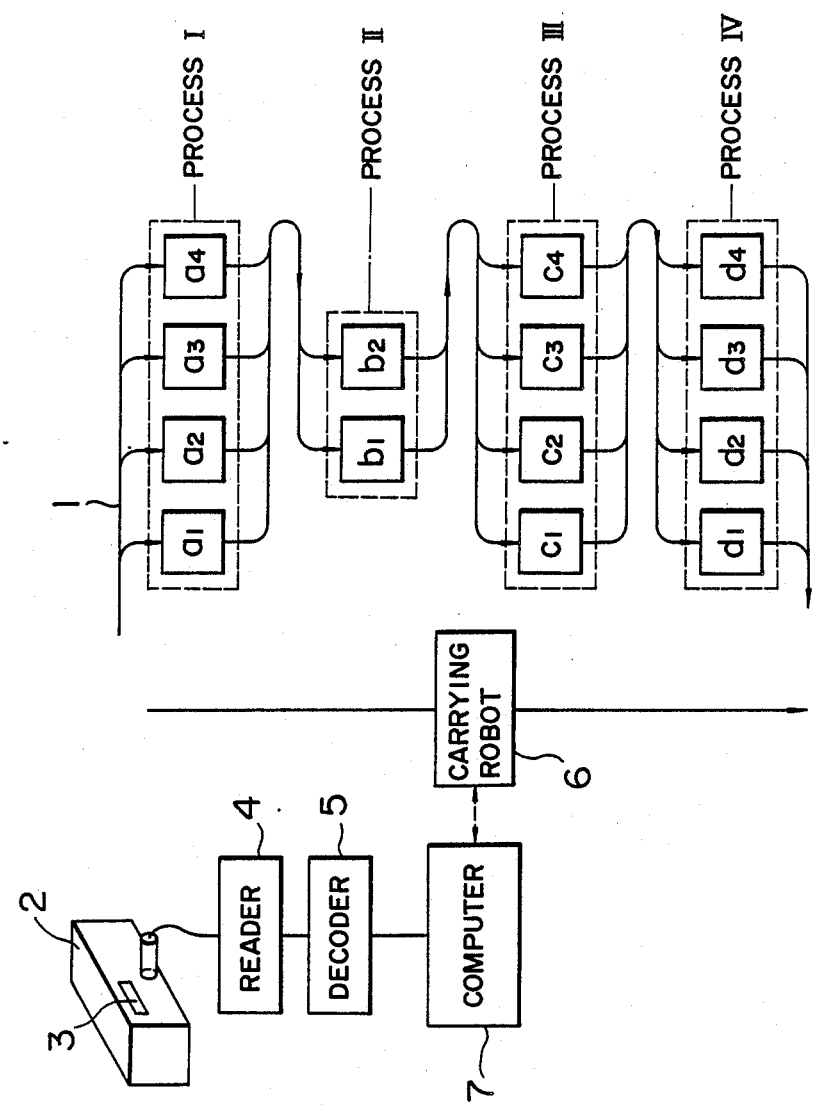
FIG. 2 is a block diagram showing an embodiment of a manufacturing apparatus according to this invention.

FIG. 2 is a block diagram showing the outline of an embodiment according to this invention. A process I in which processing units $a_1$, $a_2$, $a_3$ and $a_4$ for carrying out the processing of the first stage are disposed, a process II in which processing units $b_1$ and $b_2$ for carrying out the processing of the second stage are disposed, a process III in which processing units $c_1$, $c_2$, $c_3$ and $c_4$ for carrying out processing of the third stage are disposed, and a process IV in which processing units $d_1$, $d_2$, $d_3$ and $d_4$ for carrying out the processing of the fourth stage are disposed are arranged in succession from the upstream side to the downstream side. The intermediary product is subjected to predetermined processings while being carried from the upstream side (process I) to the downstream side (process IV) of a carrying path 1 with the intermediary product being accommodated in a carrier 2. In this sequence, various processes are conducted up to the final assembling process. A computer 7 makes a judgement on the basis of information of the discrimination code 3 attached to the outer surface of the carrier 2 to send a signal to a carrying robot 6, to thereby conduct such a carrying. A discrimination code 3 is indicated in a suitable form, e.g., a bar code, etc. in order to individually supervise or control the carrier 2. This code 3 is read by a reader 4 and is then decoded by a decoder 5, whereupon the code thus decoded is recorded into the memory unit of the computer 7 as the basic information. In this embodiment, the reader 4 is provided on the upstream side (entrance) of the first process I of the plurality of processes I, II, III and IV to read the discrimination code 3 prior to the initiation of processings, thus to send information to the memory unit of the computer 7. At times subsequent thereto, processings are continued on the basis of the discrimination codes recorded in the memory unit. In addition, processing units at respective manufacturing processes are connected to the control unit of the computer 7. These units respond to instructions from the control unit to conduct predetermined processings and to feed processing information indicative of the number of articles processed, or the number of inferior articles produced, etc. back to the control unit of the computer 7 thus to record them into, the memory unit of the computer 7. Table 1 represents the contents recorded in the memory unit of the computer 7.

In the computer 7, information indicative of the name of kind, the name of lot, and quantity of the semi-processed or intermediary product to be subjected to manufacturing processing at the process 1 is recorded by communication with a host computer 24 or manual input.

TABLE 1

| ID. No. | Name of kind | Lot Name | Quantity | Processing Units having carried out processing | | | | Completion | No. of inferior articles |
|---|---|---|---|---|---|---|---|---|---|
| E001 | x010 | Y10 | 30 | $a_1$ | $b_1$ | $c_1$ | $d_1$ | O | |
| E002 | x010 | Y10 | 30 | $a_2$ | $b_1$ | $c_2$ | $d_2$ | O | |
| E003 | x010 | Y10 | 15 | $a_3$ | $b_1$ | $c_3$ | $d_3$ | | |
| E004 | x010 | Y11 | 30 | $a_4$ | $b_2$ | $c_4$ | $d_4$ | | |
| E005 | x010 | Y11 | 15 | $a_4$ | $b_2$ | $c_4$ | | | |
| E006 | x020 | H10 | 30 | $a_1$ | $b_1$ | | | | |
| E007 | x020 | H10 | 30 | $a_2$ | | | | | |
| E008 | x020 | H10 | 15 | $a_1$ | | | | | |

TABLE 2

E001; x010; Y10: 30

| Processing unit having carried out processing | No. of good articles | No. of inferior articles | Unit working condition |
|---|---|---|---|
| $a_1$ | | | |
| $b_1$ | | | |
| $c_1$ | | | |
| $d_1$ | | | |

The column of "ID No." in Table 1 represents the basic information written by decoding the discrimination code 3 of the carrier 2 which has been read by the reader 4. The column of "Name of kind", the column of "Name of lot" and the column of "Ouantity" are supervisory information recorded in advance in the computer 7, which are obtained by transfer between memories of the computer 7. The column of "Processing unit which has conducted a processing" and the column of "Completion" are columns for writing thereinto processing information fed back from the processing units at respective processes to the control unit of the computer 7. In addition, the column of "No. of inferior articles" is the column for recording thereinto the total quantity of inferior articles when all the processings have been finished. These processing information are recorded on the basis of the discrimination code 3 in correspondence with the basis information recorded in Table 1. By way of an example, "E001" and "E002" in the column "ID No." indicate that all the processings of the product have been completed, "E003" indicates that the product is being processed by the processing unit $d_3$ at the process IV of the fourth stage, and "E006" indicates that the product is being processed by the processing unit $b_1$ at the process II of the second stage. Table 2 shows more detailed recorded processing information for every product. In Table 2, the processing information indicative of "Processing unit which has carried out processing", "No. of good articles", "No. of inferior articles" and "Unit working conditions" etc. every respective process, may be recorded. Accordingly, by recording process information at respective processes in correspondence with the basic information, it is possible to supervise where respective carriers are positioned in the manufacturing apparatus, or that products have been processed via any path. For this reason, the necessity of reading the discrimination code every processing unit is eliminated. Thus, the reading frequency and the communication frequency dependent thereupon are considerably reduced, with the result that occurrence of trouble is reduced. On the other hand, the control unit of the computer 7 selects a processing unit most suitable for processing from the group of units of the next stage on the basis of the basic information and the processing information recorded. Such a selection may be made by analysis of the processing information fed back to the processing unit, or comparison between the processing information and the basic information. For example, when the processing units C1 and C2 are executing processing and the processing units C3 and C4 are in standby state among the processing units C1 to C4 at the process III, the carrier which has completed process II may be carried to the processing units C3 and C4 in standby state. Where the inferior article occurrence rate of the processing unit C1 is high, carrying to the processing unit C1 may be avoided. In addition, a carrier of the same kind and the same lot may be continuously carried to one of the group of units. This control unit effects such a control to carry all carriers of "E001", "E002" and "E003" in which the contents of the column "Name of kind" and the column "Name of lot" are the same among the basic information recorded in the memory unit as shown in Table 1 to the processing unit $b_1$ at the process II of the second stage after the process I of the first stage has been completed. Where the product of the same kind and the same lot is processed using a specified processing unit, the start check at respective processing units necessarily required when changing the kind of article or lot becomes unnecessary, thus making it possible to execute an efficient processing with less arrangement loss on the real time basis. In addition, as will be described later, allocation program to processing units may be stored into the control unit, thus to select a suitable processing unit by this program. It is to be noted that while carrying to the processing unit selected by the control unit is conducted by the carrying robot 6, such a carrying may be conducted by an operator. In this case, by displaying the carrying schedule prepared by the control unit by using a display unit (not shown), etc., carrying can be secured conducted.

Figure 3:
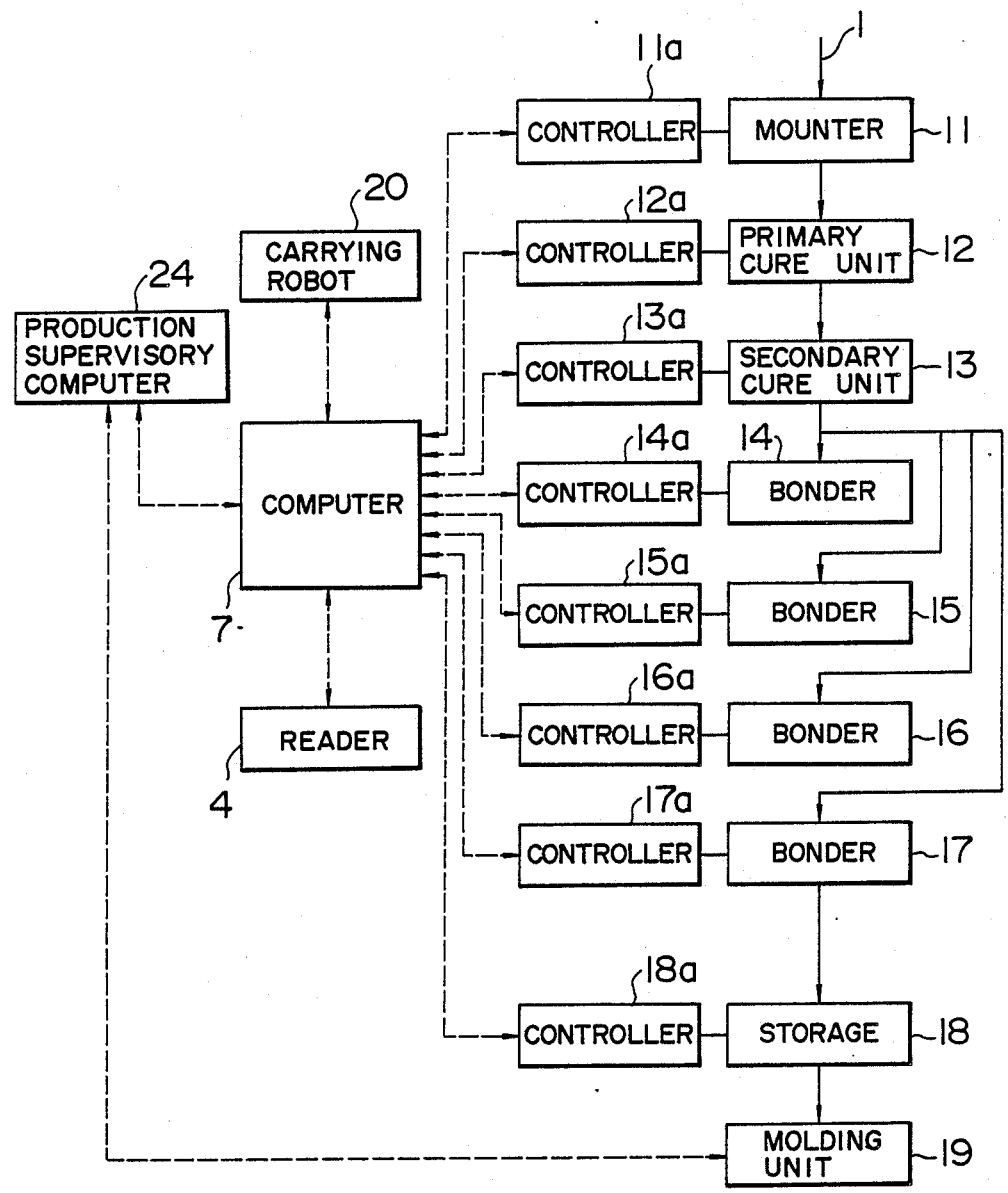
FIG. 3 is a block diagram showing another embodiment of a semiconductor manufacturing apparatus according to this invention.

FIG. 3 is a block diagram when this invention is applied to the manufacture of a semiconductor device. A mounter 11 for die-bonding a semiconductor chip (not shown) to a lead frame (not shown), a primary cure unit 12 and a secondary cure unit 13 for thermally setting a resin subject to bonding at the time of bonding for adhesively connecting or joining the lead frame and the semiconductor chip, four bonders 14, 15, 16 and 17 for wire-bonding electrodes of the semiconductor chip and leads of the lead frame, and a storage 18 for temporarily stocking the lead frame after wire bonding is completed in order to carry the lead frame to the molding unit 19 of the next process are successively arranged on the carrying path 1. These processing units are provided with controllers 11a, 12a, ... 18a, respectively. The respective controllers 11a, 12a, ... 18a are connected to the computer 7 for supervising or controlling the discrimination code and the processing information to conduct a control for allocation to processing units. Accordingly, the computer 7 records, into the memory unit, the processing information fed back from the respective controllers 11a, 12a, ... 18a. On the other hand, the reader 4 for reading the discrimination code of the intermediary product is connected to the computer 7. Thus, the discrimination code from the reader 4 is recorded into the memory unit of the computer 7 as basic information. Also in this embodiment, the processing information from the controllers 11a, 12a, ... 18a are recorded in correspondence with the basic information in the same manner as in the above-mentioned embodiment. While the computer 7 controls a carrying robot 20 for carrying an intermediary product to an allotted processing unit, its drive is controlled by a production supervisory computer 24 serving as a host computer. In this embodiment, the intermediary product is mounted on a lead frame 21 as shown in FIG. 4(A). A large number of lead frames 21 are carried or conveyed on the carrying path 1 each lead frame 21 being accommodated into a magazine 22 serving as a carrier. In this case, as shown in FIG. 4(B), a plurality of step portions 22a are oppositely formed on the inner side surface of the magazine 22. The lead frame 21 is carried with it being supported by the respective step portions 22a. On the upper surface of the magazine 22, a discrimination code 23 indicated by a bar code, etc. is attached. This discrimination code 23 is read by the reader 4. Reading such a discrimination code 23 is conducted upstream of the mounter 11 for die-bonding which is the manufacturing process of the first stage or at the entrance of the mounter 11. In the configuration stated above, the system having the following function is assembled into the computer 7.

Figure 5:
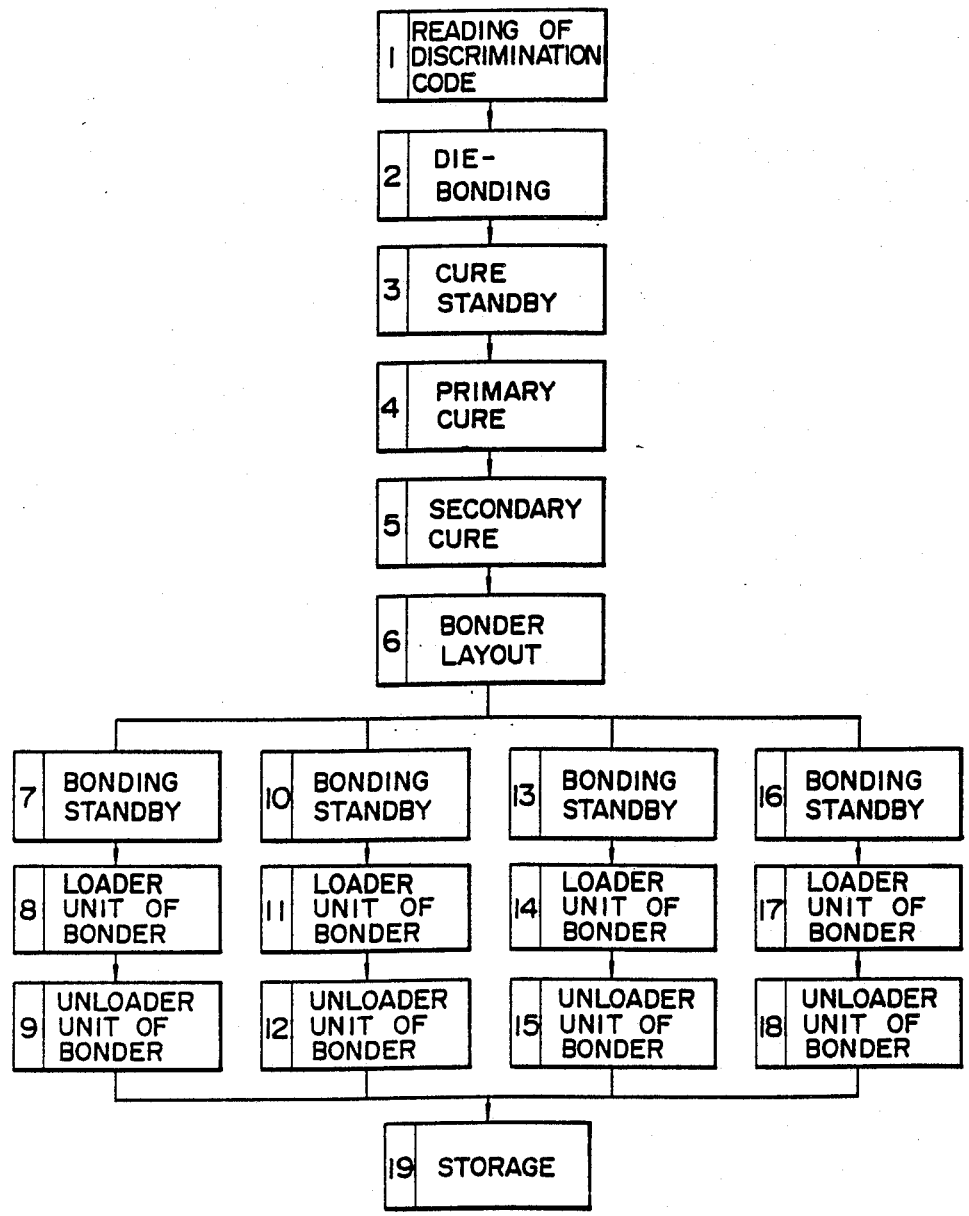
FIG. 5 is a block diagram showing the tracking positions in the semiconductor manufacturing apparatus.

(1) Carrying control of the magazine 22
(2) Tracking supervision of the magazine 22
(3) Communication of production information with the group of units at respective processes
(4) Communication with the production supervisory computer FIG. 5 shows the manufacturing processing of the magazine and tracking positions at which standby state is required for the manufacturing processing. Where reading the discrimination code of the magazine 22 by the reader 4 is at the tracking position of No. 1, the tracking position at the storage 18 is No. 19. Thus, 19 tracking positions are necessary in total. Accordingly, memory areas corresponding to at least 19 columns for the processing information corresponding to one discrimination code are provided in the memory unit of the computer, in which recording and/or supervision of all the processing information are conducted. As an example of this recording, a discrimination code 23 of a vacant magazine 22 is read by the reader 4 as the processing information at the tracking position No. 1. This information is recorded into the first column of the tracking Table (Table 3) in the memory unit corresponding to the basic information obtained from the discrimination code.

TABLE 3

| Discrimination code | Tracking position | Mount processing information | Cure processing information | Bonding processing information |
| --- | --- | --- | --- | --- |
| E005 | 1 | | | |
| E004 | 2 | xx | | |
| E003 | 3 | xxxx | | |
| E002 | 4 | xxxx | xx | |
| E001 | 5 | xxxx | xxx | |
| ... | ... | ... | ... | ... |
| ... | ... | ... | ... | ... |
| D050 | 18 | xxxx | xxxx | xxx |
| D049 | 19 | xxxx | xxxx | xxxxx |

When the magazine 22 is then carried to the mounter 11, the processing information is recorded into the second column of the tracking Table. When the die-bonding by the mounter 11 is completed and the magazine 22 is carried to the standby position for curing, the processing information is recorded into the third column of the tracking Table. In the same manner as stated above, at times subsequent thereto, by recording the processing information in succession, the supervision of the magazine is carried out. Accordingly, not only the necessity of reading discrimination codes at respective processes for manufacturing processing is eliminated, but also processing information are recorded every tracking position, to thereby change them to the data base with the discrimination code being as a key, thus making it possible to expand the function as follows:

(1) Grasp of working achievement of individual processing units
(2) Grasp of inferior article occurrence rate in the individual processing units
(3) Grasp of output or yield every lot
(4) Grasp of time at which production starts or ends with every lot or process
(5) Confirmation of name of kind, name of lot, the number of products, the number of good article, the number of inferior articles, the processing start time/end time, and result of start check
(6) Efficient allocation of the magazine to four bonders 14, 15, 16 and 17

An actual example of the above function (6) will be described. FIG. 6 shows the arrangement of the processing units at the cure process and the wire bonding process. The primary cure unit 12 and the secondary cure unit 13 are adjoiningly provided. On both the sides of these units, a loader 25 and an unloader 26 are disposed. Magazine is delivered from the unloader 26 to four bonders 14, 15, 16 and 17. Reference numeral 27 denotes a save area for placing the magazine 22 in a standby state when all the bonders 14, 15, 16 and 17 are executing processing. For one curing operation, three magazines 22 are processed at the same time. Three magazines 22 are taken or carried out from the left side of the unloader 26 to the cure positions of $P_1$, $P_2$ and $P_3$ thereof and are then supplied to the bonder in order of $P_3$, $P_2$ and $P_1$. In this embodiment, the bonders 14, 15, 16 and 17 of the same structure are used.

Figure 7:
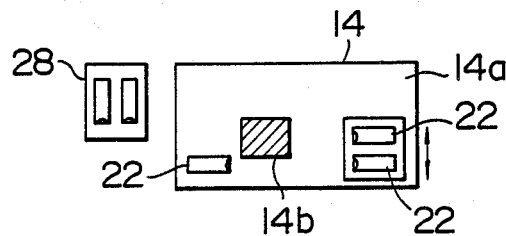
FIG. 7 is a plan view showing the wire bonder in the semiconductor manufacturing apparatus.
Figure 8A:
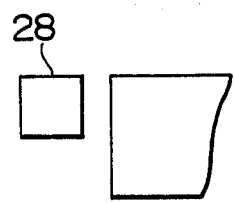
FIGS. 8(A) to 8(D) are plan views showing how the wire bonder changes.
Figure 8B:
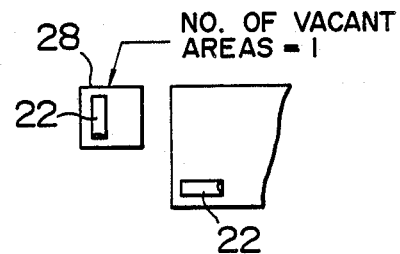
Figure 8C:
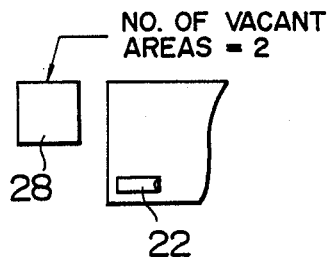
Figure 9:
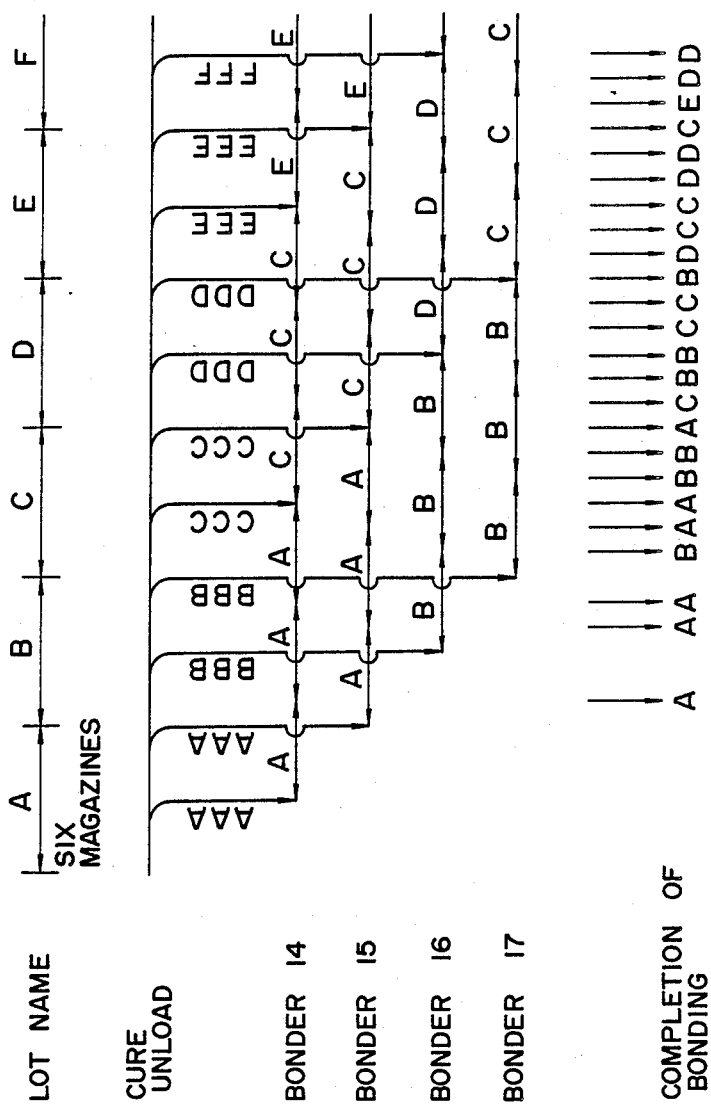
FIG. 9 is a sequence diagram of the wire bonder.

Such structure will be described with reference to FIG. 7 by taking an example of the bonder 14. At the central portion of a body 14a, a bonding head 14b for carrying out wire-bonding is provided. On the upstream side (on the left) of the bonding head, one magazine 22 is carried in. From this magazine, lead frames 21 are taken out one by one and are then subjected to wire-bonding. Then, these lead frames are accommodated into empty or vacant magazines 22 which are in standby state on the downstream side (on the right). Accordingly, the upstream side of the bonding head serves as a loader unit which supplies lead frames to be processed. In addition, on the upstream sides of respective bonders 14, temporary mount tables 28 for standing by at least two magazines are provided for the reason described below. Since three magazines are taken or carried out from the unloader 26 at the same time, it is necessary to stand by two magazines except for one magazine being processed at the beginning of the wire-bonding. Accordingly, when the wire-bonding is continued, magazines on the temporary mount table 28 are carried out onto the bonder one by one. Before wire-bonding, the body of the bonder and the temporary mount table 28 are all in empty state as shown in FIG. 8(A). According as the wire-bonding proceeds, the state of the body of the bonder and the temporary table changes as follows: The temporary mount table 28 is in full state (FIG. 7)→One vacant area occurs on the temporary mount table (FIG. 8(B))→The temporary mount table is all in vacant state (No. of vacant areas is two) (FIG. 8(C))→The temporary mount table is all in vacant sate and the magazine on the loader of the bonder is in vacant state. Finally, the state is returned to the state shown in FIG. 8(A). It is to be noted that the magazine taken or carried into the loader unit in FIGS. 8(B) and 8(C) is a processing magazine in which lead frames to be processed are accommodated. For allocating a magazine train carried or taken out onto the unloader 26 on the downstream side of the cure unit 13 to the four bonders 14, 15, 16 and 17 under the above condition, there is employed a method to read from the above-mentioned tracking table the name of lot of magazine on the unloader 26 and the name of lot of a proceeding magazine allocated to the bonder in advance to allocate them on the basis of the sequence shown in FIG. 9. In FIG. 9, symbols A, B, C, D, E and F represent lot names of articles to be processed. Respective lots A to F are accommodated into six magazines, respectively. They are taken or carried out onto the unloader 26 of the cure unit every three magazines. Table 4 shows an allocation pattern to the cure positions $P_1$, $P_2$ and $P_3$ of the magazine occurring on the unloader 26 of the cure unit 13.

TABLE 4

| Pattern No. | Cure Position | | | Preceding Lot |
|---|---|---|---|---|
| | P1 | P2 | P3 | |
| No. 1 | | | A | — |
| No. 2 | | | A | A |
| No. 3 | | | B | A |
| No. 4 | | A | A | — |
| No. 5 | | B | A | — |
| No. 6 | | A | A | A |
| No. 7 | | B | A | A |
| No. 8 | | B | B | A |
| No. 9 | | C | B | A |
| No. 10 | A | A | A | — |
| No. 11 | B | A | A | — |
| No. 12 | B | B | A | — |
| No. 13 | C | B | A | — |
| No. 14 | A | A | A | A |
| No. 15 | B | A | A | A |
| No. 16 | B | B | A | A |
| No. 17 | C | B | A | A |
| No. 18 | B | B | B | A |

TABLE 4-continued

| Pattern No. | Cure Position | | | Preceding Lot |
|---|---|---|---|---|
| | P1 | P2 | P3 | |
| No. 19 | C | B | B | A |
| No. 20 | C | C | B | A |
| No. 21 | D | C | B | A |

Table 4 shows the example that the preceding magazine has only lot A. In this case, twenty one (21) kinds of patterns from No. 1 to No. 21 are generated. The computer 7 supervises or monitors these patterns to carry out a control of layout to the bonders. FIGS. 10 to 18 show flowcharts for layout, which correspond to layout procedures as shown in Table 5, respectively.

TABLE 5

Figure 10:
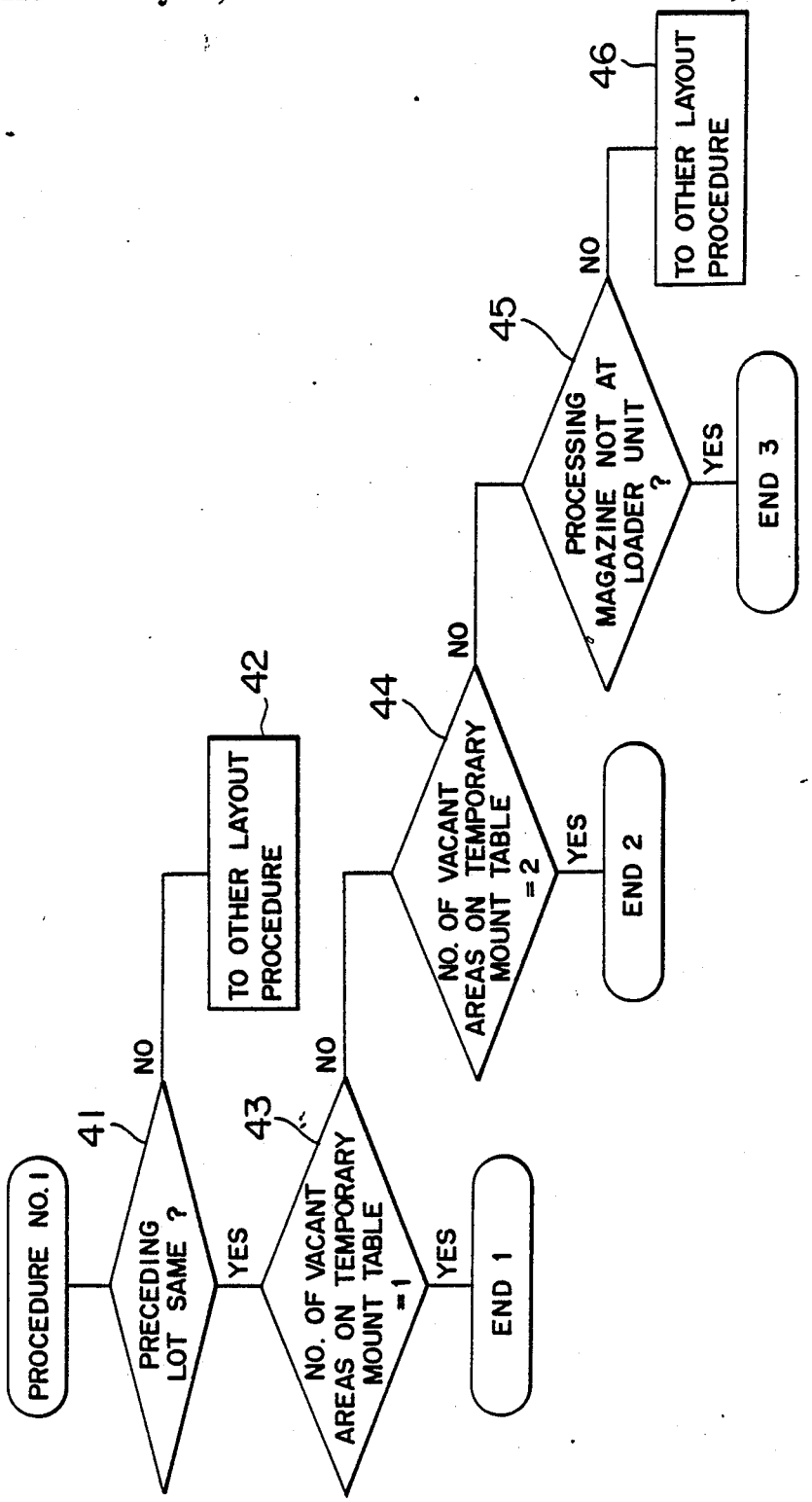
FIG. 10 through FIG. 18 are flowcharts for controlling the layout of the wire bonder.
Figure 11:
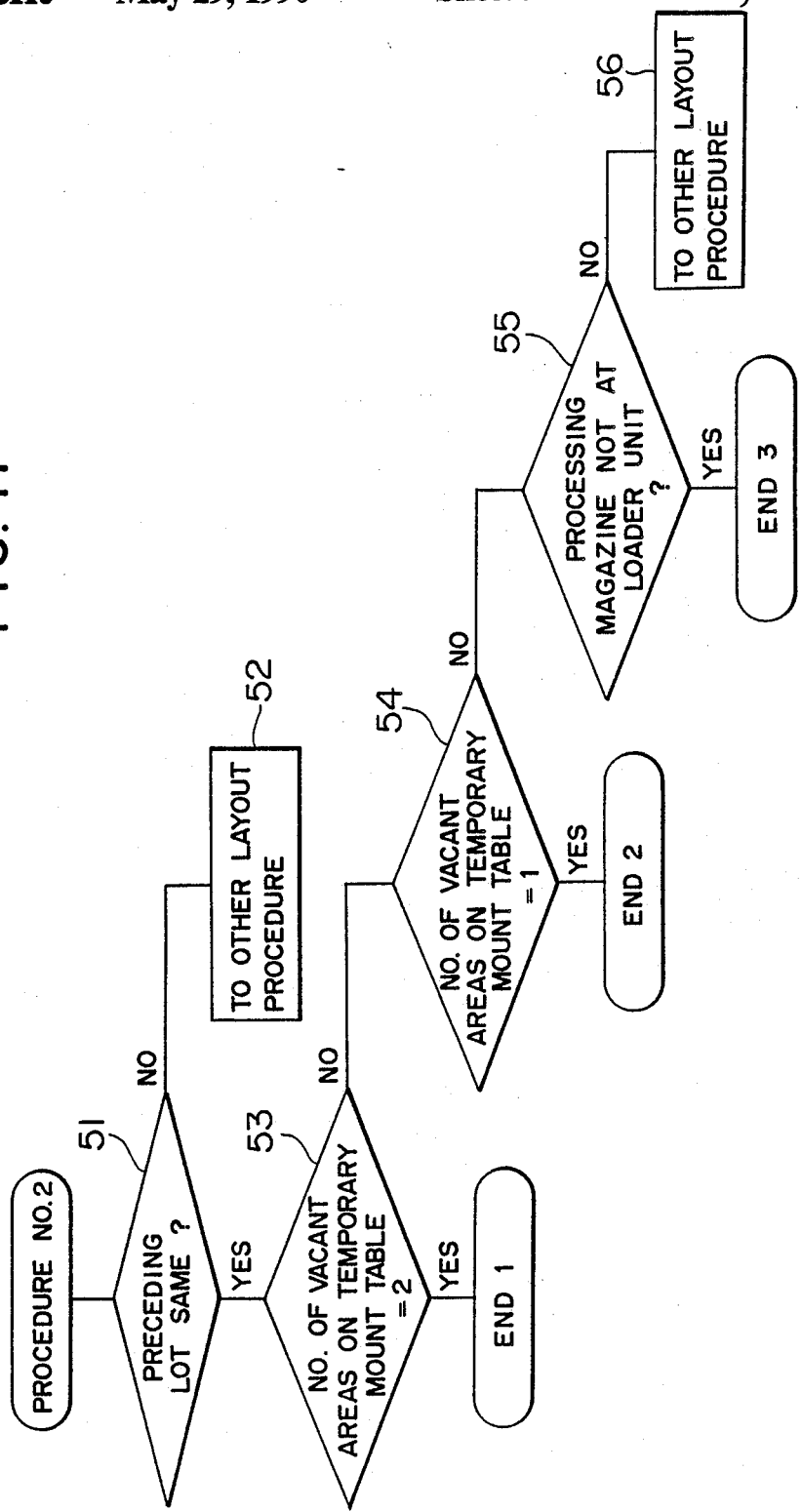
Figure 12:
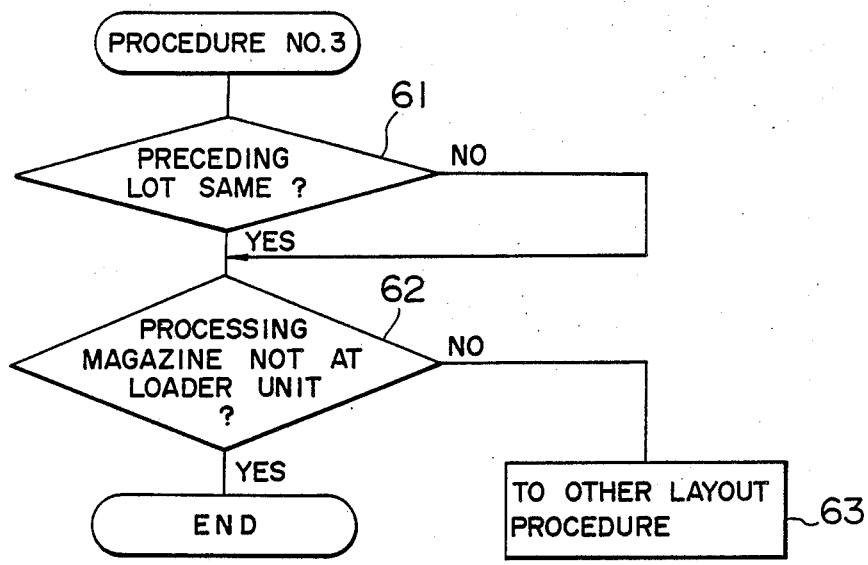
Figure 13:
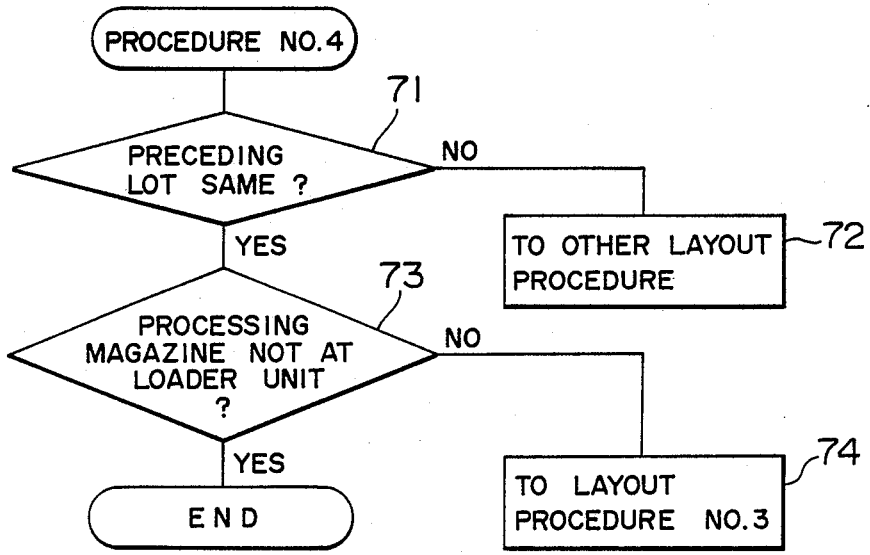
Figure 14:
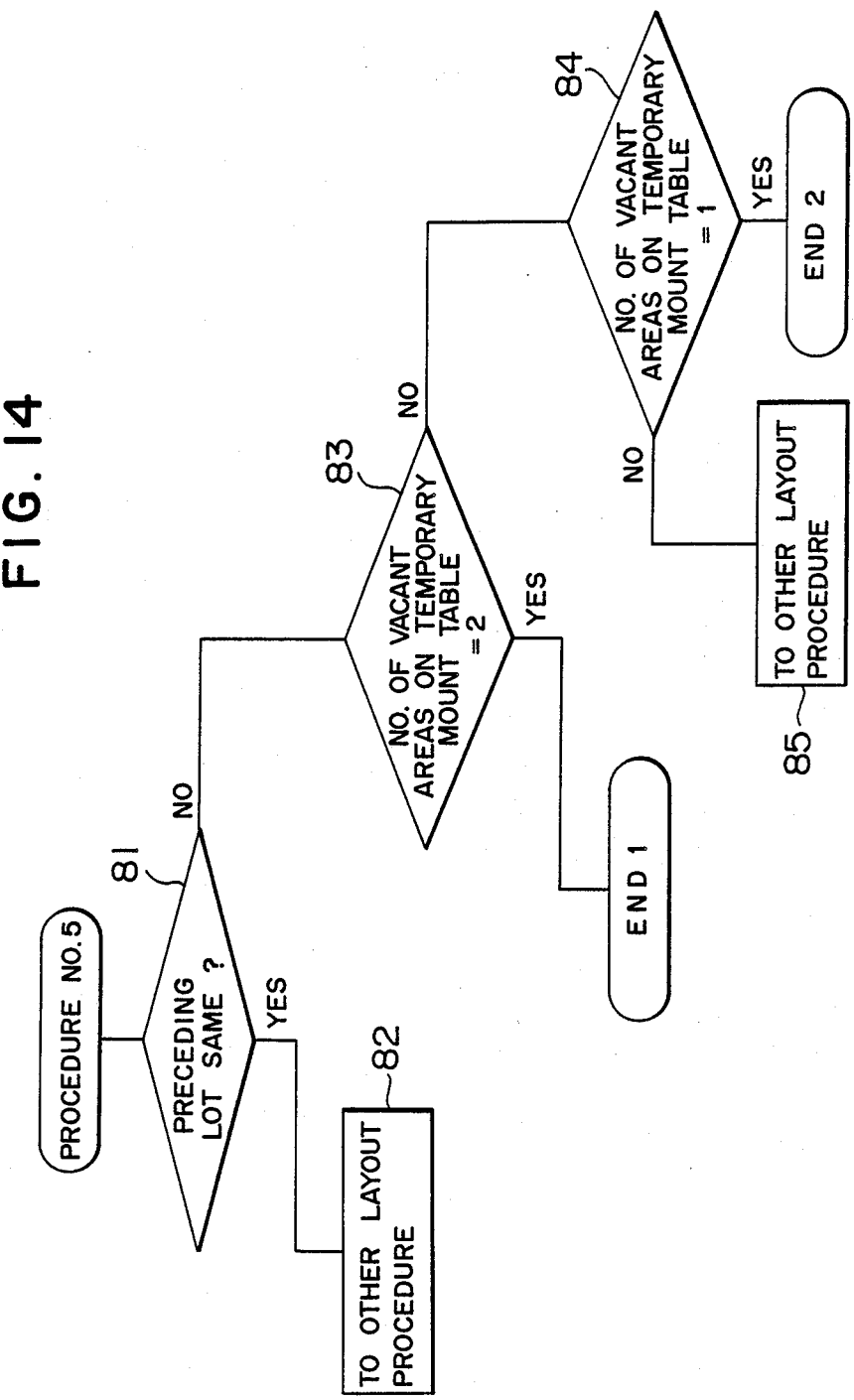
Figure 15:
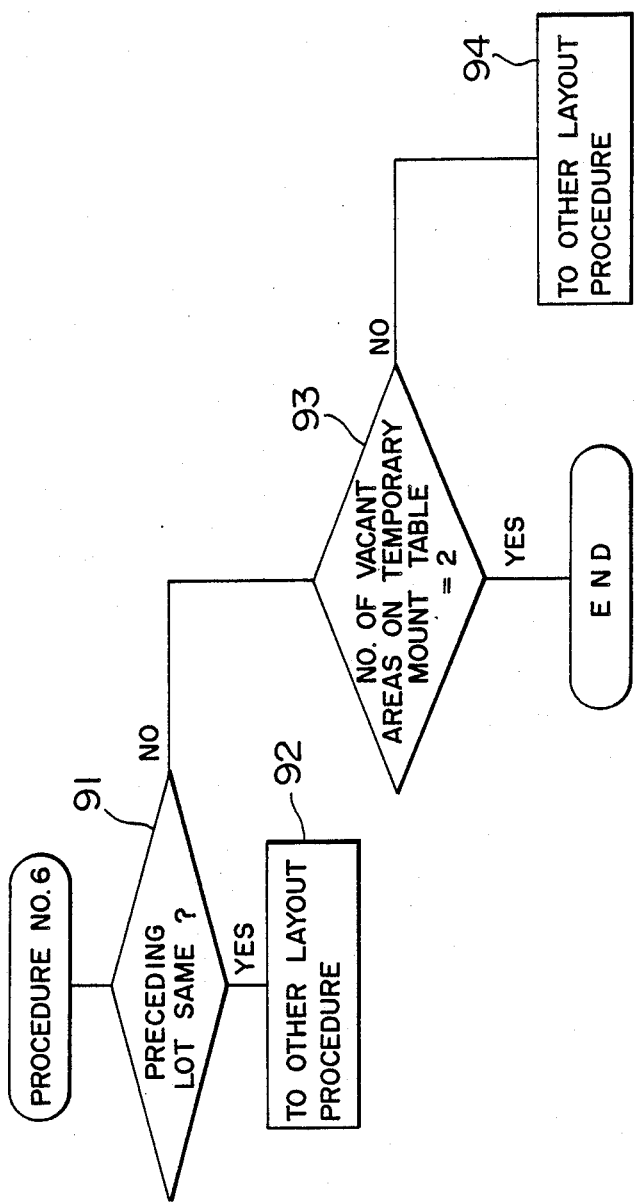
Figure 16:
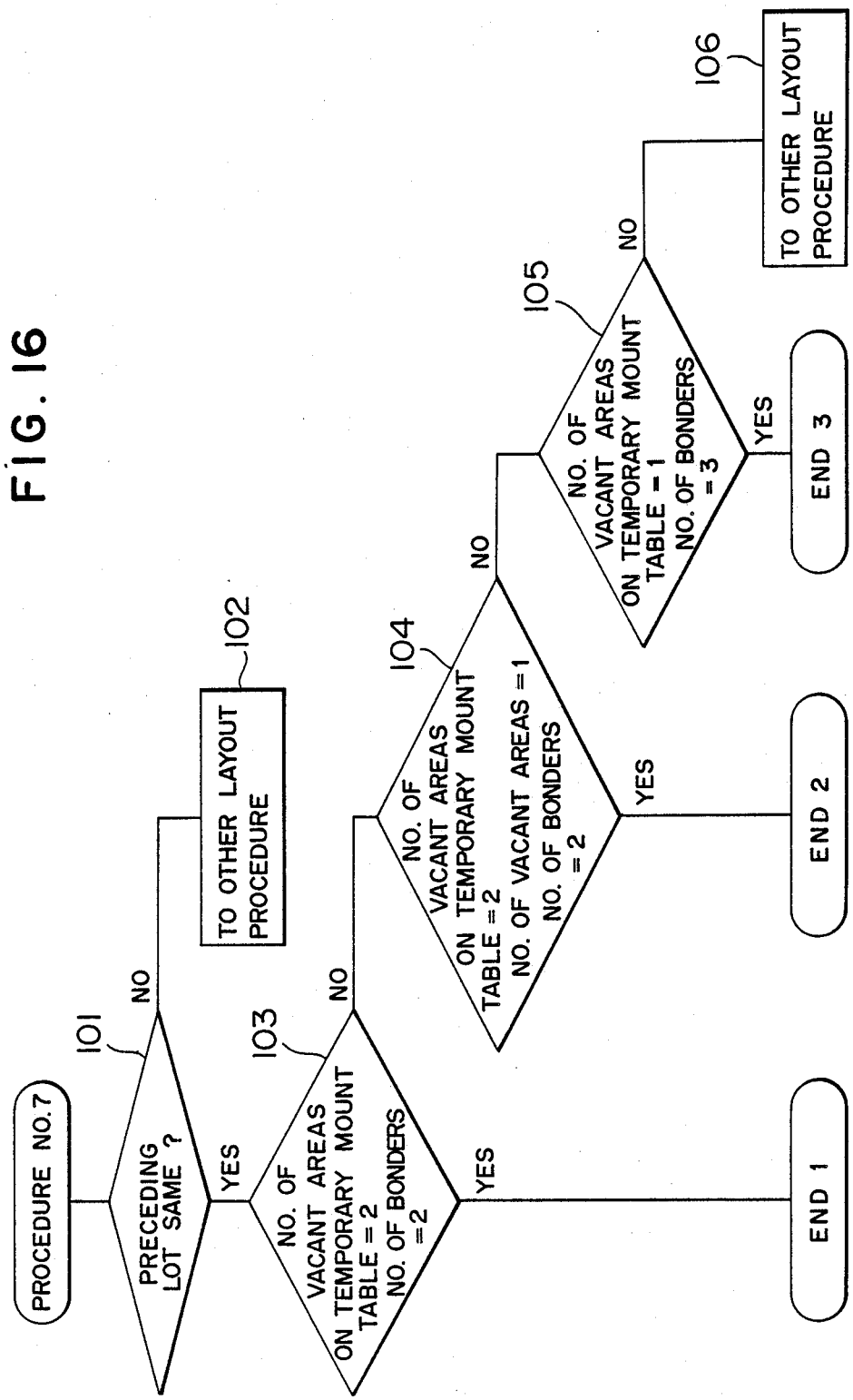
Figure 17:
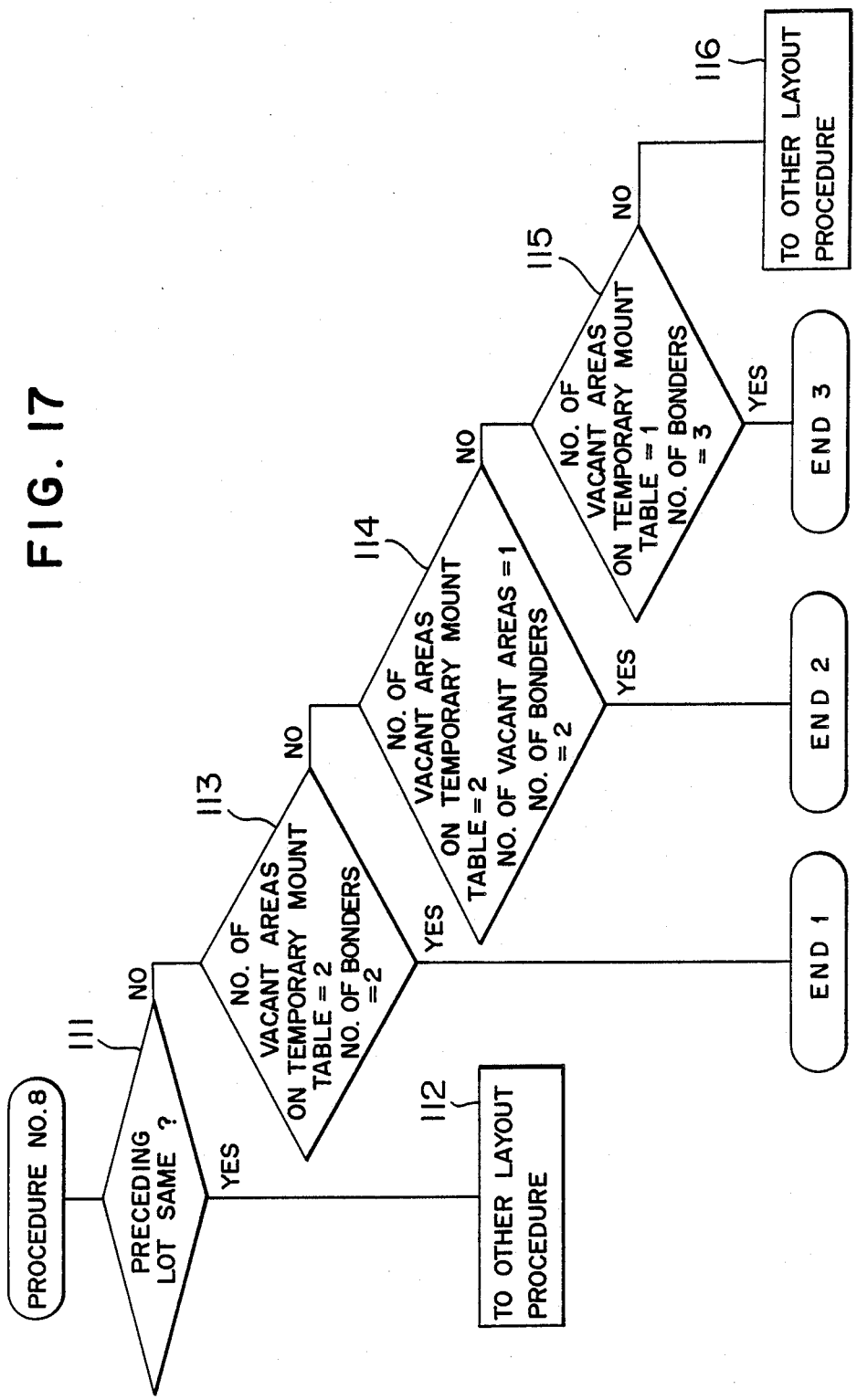
Figure 18:
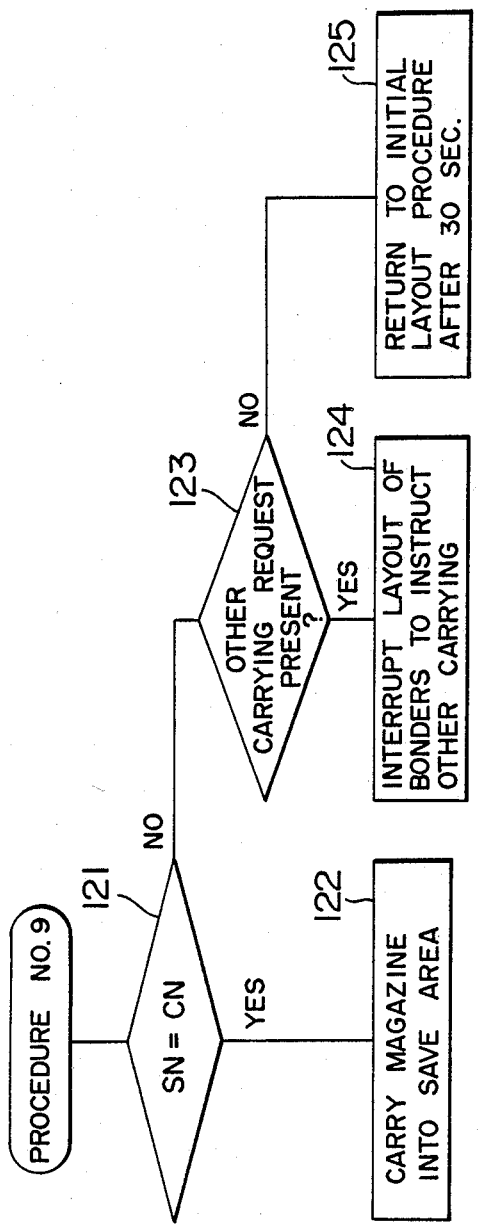

| Layout procedure | Flowchart |
|---|---|
| No. 1 | FIG. 10 |
| No. 2 | FIG. 11 |
| No. 3 | FIG. 12 |
| No. 4 | FIG. 13 |
| No. 5 | FIG. 14 |
| No. 6 | FIG. 15 |
| No. 7 | FIG. 16 |
| No. 8 | FIG. 17 |
| No. 9 | FIG. 18 |

The programs based on these flowcharts are stored in the computer 7. They are called in order of the pattern layout Table (Table 6) similarly stored in the control unit and are executed sequentially.

TABLE 6

| Pattern No. | Layout procedure |
|---|---|
| 1, 3 | No.-3. → No.-5, → No.-9 |
| 2 | No.-1. → No.-3. → No.-9 |
| 4, 5, 8, 9 | No.-3. → No.-6. → No.-9 |
| 6 | No.-2. → No.-3. → No.-9 |
| 7 | Lot A No.-1, → No.9 |
| | Lot B No.-3, → No.-5, → No.-9 |
| 10, 11, 12, 13, 18, 19, 20, 21 | No.-3. → No.-9 |
| 14 | No.-4. → No.-7. → No.-8. → No.-9 |
| 15 | Lot A No.-2, → No.9 |
| | Lot B No.-3, → No.-5, → No.-9 |
| 16, 17 | Lot A No.-1, → No.-9 |
| | Lot B No.-3, → No.-6, → No.-9 |
| | Lot C No.-3, → No.-6, → No.-9 |

Figure 8D:
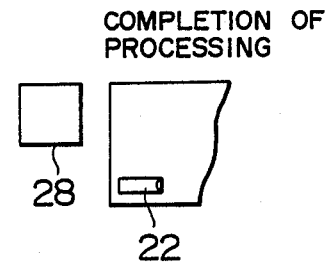

At the layout procedure No. 1, as shown in FIG. 10, comparison between the lot name of the magazine taken or carried out onto the unloader 26 and the lot name of the preceding magazine on the bonder is made (step 41). When the lot names are different from each other, the layout operation shifts to other layout procedure subsequent to the layout procedure No. 1 in accordance with the sequence or order shown in Table 6 (step 42). On the other hand, when the lot names are the same, a judgement as to whether or not the number of vacant or unoccupied areas on the temporary mount table 28 is one is made (step 43). As a result, when the number of vacant areas is one, the layout operation is completed (END I). In contrast, when the number of vacant areas is not one, a judgement as to whether or not the number of vacant areas is two is made (step 44). As a result, when the number of vacant areas is two, the layout operation is completed (END 2). In contrast, when the number of vacant areas is not two, a judgement as to whether or not the processing magazine in which lead frames are accommodated is present at the loader unit of the bonder is made (step 45). As a result, when the processing magazine is absent (FIG. 8(D)), the layout operation is completed (END 3). In contrast, when the processing magazine is present, the layout operation shifts to other layout procedure subsequent to the layout procedure No. 1 in accordance with the sequence or order shown in Table 6 (step 46). It is to be noted that the END processing in the layout procedure is preferentially handled or executed in order of END 1, END 2 and END 3.

At the layout procedure No. 2, as shown in FIG. 11, comparison between the lot name of the magazine taken or carried out onto the unloader 26 and the lot name of the preceding magazine on the bonder is made (step 51). When the lot names are different from each other, the layout operation shifts to other layout procedure subsequent to the layout procedure No. 2 in accordance with sequence or order shown in Table 6 (step 52). In contrast, when the lot names are the same, a judgement as to whether or not the number of vacant areas on the temporary mount table is two is made (step 53). As a result, when the number of vacant areas is two, the layout operation is completed (END 1). In contrast, when the number of vacant areas is not two, a judgement as to whether or not the number of vacant areas is one is made (step 54). As a result, when the number of vacant areas is one, the layout operation is completed (END 2). In contrast, when the number of vacant areas is not one, a judgement as to whether or not the processing magazine in which lead frames are accommodated is present at the loader unit of the bonder is made (step 55). As a result, when the processing magazine is absent, the layout operation is completed (END 3). In contrast, when the processing magazine is present, the layout operation shifts to other layout procedure subsequent to the layout procedure No. 2 in accordance with the sequence or order shown in Table 6 (step 56).

At the layout procedure No.3, as shown in FIG. 12, a judgement as to whether or not the processing magazine in which lead frames are accommodated is present at the loader unit of the bonder is made (step 62), irrespective of whether or not the lot name of the magazine taken or carried out onto the unloader 26 and the lot name of the preceding magazine on the bonder are in correspondence with each other (step 61). As a result, when the processing magazine is absent, the layout operation is completed (END). In contrast, when the processing magazine is present, the layout operation shifts to other layout procedure subsequent to the layout procedure No. 3 in accordance with the sequence or order shown in Table 6 (step 63).

At the layout procedure No. 4, as shown in FIG. 13, a judgement as to whether or not the lot name of the magazine taken or carried out onto the unloader 26 and the lot name of the preceding magazine on the bonder are in correspondence with each other is made (step 71). As a result, when the lot names are different from each other, the layout operation shifts to other layout procedure subsequent to the layout procedure No. 4 in accordance with the sequence or order shown in FIG. 6 (step 72). In contrast, when the lot names are the same, a judgement as to whether or not the processing magazine in which lead frames are accommodated in present at the loader unit of the bonder is made (step 73) As a result, when the processing magazine is absent, the layout operation is completed (END). In contrast, when the processing magazine is present, the layout operation shifts to the layout procedure No. 3 (step 74).

At the layout procedure No. 5, as shown in FIG. 14, comparison between the lot name of the magazine taken or carried out onto the unloader 26 and the lot name of the preceding magazine on the bonder is made (step 81). As a result, when the lot names are the same, the layout operation shifts to other layout procedure subsequent to the layout procedure No. 5 in accordance with the sequence or order shown in Table 6 (step 82). In contrast, when the lot names are different from each other, a judgement as to whether or not the number of vacant areas on the empty temporary mount table is two is made (step 83). As a result, when the number of vacant areas is two, the layout operation is completed (END 1). In contrast, when the number of vacant areas is not two, a judgement as to whether or not the number of vacant areas is one is made (step 84). As a result, when the number of vacant areas is one, the layout operation is completed (END 2). In contrast, when the number of vacant areas is not one, the layout operation shifts to other layout procedure subsequent to the layout procedure No. 5 in accordance with the sequence or order shown in Table 6 (step 85).

At the layout procedure No. 6, as shown in FIG. 15, comparison between the lot name of the magazine taken or carried out onto the unloader 26 and the lot name of the preceding magazine on the bonder is made (step 91). As a result, when the lot names are the same, the layout operation shifts to other layout procedure subsequent to the layout procedure No. 6 in accordance with the sequence or order shown in Table 6 (step 92). In contrast, when the lot names are different from each other, a judgement as to whether or not the number of vacant areas on the temporary mount tables 28 is two is made (step 93). As a result, when the number of vacant areas is two, the layout operation is completed (END). In contrast, when the number of vacant areas is not two, the layout operation shifts to other layout procedure subsequent to the layout procedure No. 6 shown in Table 6 (step 94).

At the layout procedure No. 7, as shown in FIG. 16, comparison between the lot name of the magazine taken or carried out onto the unloader 26 and the lot name of the preceding magazine on the bonder is made (step 101). As a result, when the lot names are different from each other, the layout operation shifts to other layout procedure subsequent to the layout procedure No. 7 in accordance with the sequence or order shown in Table 6 (step 102). As a result, when the lot names are the same, a judgement as to whether or not two bonders in which the number of vacant areas on the temporary mount table 28 is two are present is made (step 103). As a result, when such two bonders are present, the layout operation is completed (END 1). In contrast, when they are absent, a judgement as to whether or not one bonder in which the number of vacant areas on the temporary mount tables is two and one bonder in which the number of vacant areas on the temporary mount table is one are present is made (step 104). As a result, when such bonders are present, the layout operation is completed (END 2). In contrast, when they are absent, a judgement as to whether or not three bonders in which the number of vacant areas on the empty temporary mount table is one are present is made (step 105). As a result, when such bonders are present, the layout operation is completed (END 3). In contrast, why they are absent, the layout operation shifts to other layout procedure subsequent to the layout procedure No. 7 in accordance with the sequence or order shown in Table 6 (step 106).

At the layout procedure No. 8, as shown in FIG. 17, comparison between the lot name of the magazine taken or carried out onto the unloader 26 and the lot name of the preceding magazine on the bonder is made (step 111). As a result, when the lot names are the same, the layout operation shifts to other layout procedure subsequent to the layout procedure No. 8 in accordance with the sequence or order shown in Table 6 (step 112). In contrast, when the lot names are different from each other, a judgement as to whether or not two bonders in which the number of vacant areas on the temporary mount table 28 is two are present is made (step 113). As a result, when such bonders are present, the layout operation is completed (END 1). In contrast, when they are absent, a judgement as to whether or not one bonder in which the number of vacant areas on the empty temporary mount table 28 is two and one bonder in which the number of vacant areas on the empty temporary mount table is one is made (step 114). As a result, when such bonders are present, the layout operation is completed (END 2). In contrast, when they are absent, a judgement whether or not three bonders in which the number of vacant areas on the empty temporary mount table is one are present is made (step 115). As a result, when such bonders are present, the layout operation is completed (END 3). In contrast, when they are absent, the layout operation shifts to other layout procedure subsequent to the layout procedure No. 8 in accordance with the sequence or order shown in Table 6 (step 116).

The layout procedure No. 9 are, as shown in Table 6, the final procedure for all the patterns No. 1 to No. 21. At this layout procedure No. 9, as shown in FIG. 18, comparison between the number of magazines (SN) which can be placed on the save area 27 and the number of magazines (CN) on the unloader 26 of the cure unit is made (step 121). As a result, when the SN value is equal to the CN value or larger than that, magazines on the unloader 26 are taken or carried into the save area 27 (step 122). On the other hand, when the SN value is smaller than the CN value, a judgement as to whether or not there is a request for carrying other magazines is made (step 123). As a result, when such a request is present, layout to the bonder is interrupted to instruct carrying of other magazines (step 1240. In contrast, when such a request is absent, the program execution is stopped for a predetermined time (e.g. 30 seconds). Then, the layout operation returns to the first layout procedure to restart therefrom (step 125).

In this embodiment, the allocation pattern shown in Table 4, the pattern allocation Table shown in Table 6 and the algorithm for the allocation flowchart shown in FIG. 18 are stored into the control unit as the allocation program. Thus, selective processing of bonders is carried out. An explanation will be made, e.g., in connection with the case where the pattern occurring on the unloader 26 of the cure unit is the pattern No. 2 shown in Table 4. In such a case, as shown in Table 6, the layout operation shifts from the layout procedure No. 1 to the layout procedure No. 3, and further shifts to the layout procedure No. 9. Accordingly, this indicates that the layout operation shifts to the layout procedure No. 3 at the both steps 42 and 46 in FIG. 10 indicating the layout procedure No. 1 and further shifts to the layout procedure No. 9 at the step 63 in the layout procedure No. 3 (FIG. 12). Then, the layout operation returns to the first layout procedure No. 1 after 30 seconds at the step 125 in the layout procedure No. 9. Thus, the processings as stated above are continuously executed, thereby making it possible to implement a suitable layout to one bonder of the group of bonders.

What is claimed is:

1. A method for manufacturing products produced by a plurality of processes for processing intermediary products sequentially at a plurality of processing stages to complete products while transferring said intermediary products or carriers for accommodating said intermediary products therein, each said processing stages comprising a plurality of similar processing units capable of carrying out the process of that processing state, the method comprising the steps of:
   reading discriminating codes associated with said intermediary products only prior to the first processing stage;
   storing said read discrimination codes as basic information and storing corresponding processing information in regard to the processing by said processing units in memory means; and
   selecting one processing unit from said plurality of processing units at a processing stage subsequent to said first processing stage on the basis of said processing information stored.

2. A method for manufacturing products as set forth in claim 1, wherein said storing step further comprises a step of storing supervisory information relating to said respective intermediary products or carriers and corresponding to said basic information.

3. A method for manufacturing products as set forth in claim 1, wherein said processing information includes information indicative of processing units selected at said respective processing stages, and information indicative of processed results by the selected processing units.

4. A method for manufacturing products as set forth in claim 2, wherein said processing information include information indicative of processing units selected at said respective processing stages, and information indicative of processed results by the selected processing units, said supervisory information including information in regard to the kind, the lot number, or quantity of said respective intermediary products or carriers.

5. An apparatus for manufacturing products in which a plurality of processing units are arranged at a plurality of processing stages, said processing stages being disposed for manufacturing intermediary products sequentially to complete products while transferring said intermediary products or carriers for accommodating said intermediary products therein, each said processing unit at the same processing stage being adapted to carry out the same process, said apparatus comprising:
   read means for reading discrimination codes associated with said intermediary products only prior to the first processing stage;
   first storage means for storing supervisory information in regard to said respective intermediary products or carriers;
   second stages means for storing said discrimination codes as basic information and storing processing information related to said processes carried out by said processing units at respective processing stages;
   supervisory control means for controlling storage in said second storage means and selection of one processing unit from the plurality of processing units at a processing stage subsequent to said first processing stage on the basis of information stored.

6. An apparatus for manufacturing products as set forth in claim 5, wherein said processing information includes information indicative of processing units selected at said respective processing stages, and information indicative of processed results by the selected processing units, said supervisory information including information in regard to the kind, the lot number, or quantity of said respective intermediary products or carriers.

* * * * *